United States Patent [19]

Charlot, Jr.

[11] 3,731,307

[45] May 1, 1973

[54] ELECTRICAL DETECTING MEANS

[75] Inventor: Lincoln H. Charlot, Jr., Tampa, Fla.

[73] Assignee: Minnesota Mining and Manufacturing Company, St. Paul, Minn.

[22] Filed: July 9, 1971

[21] Appl. No.: 161,917

Related U.S. Application Data

[63] Continuation of Ser. No. 817,801, April 21, 1969, abandoned.

[52] U.S. Cl. ............... 343/7.5, 343/5 PD, 343/7.7, 340/258 A
[51] Int. Cl. ................. G01s 9/42, G08b 13/22
[58] Field of Search ............ 343/5 PD, 7.5, 7.7; 340/258 A

[56] References Cited

UNITED STATES PATENTS

3,440,650  4/1969  Kimball ................. 343/5 PD

Primary Examiner—T. H. Tubbesing
Attorney—Kinney, Alexander, Sell, Steldt & Delahunt

[57] ABSTRACT

A pulsed mode radar detector the pulse repetition rate of which is a function of environment and moving object reflected signals which has a negative feedback voltage regulator for maintaining the radar detector pulse rate constant from one environment to another. The detector pulse interval is essentially constant but the interpulse interval, for a given supply voltage, varies according to the reflected signal phase and amplitude. The negative feedback voltage regulator compensates for a change in the environment reflected signal to provide a constant duration interpulse interval from one environment to another.

16 Claims, 5 Drawing Figures

INVENTOR.
LINCOLN H. CHARLOT JR
BY Kinney, Alexander,
Sell, Steldt & DeLa Hunt
ATTORNEYS

ELECTRICAL DETECTING MEANS

This is a continuation of Ser. No. 817,801, filed Apr. 21, 1969, now abandoned.

BACKGROUND OF THE INVENTION

Briefly, radar intrusion detector systems monitor a prescribed area by producing an interrogating wave of radio frequency signals and receiving reflections of those waves from objects within the area. Reflections from stationary objects, the environment, form a received signal which is unchanging, but a moving object produces a received signal which changes relative to the quiescent or environment reflected received signal, the changes including a Doppler period change in phase of the reflected signal.

An example of a system which employs the Doppler period change in phase phenomenon to detect moving objects is set forth in my U.S. Pat. No. 3,407,403. In that system, signals representative of the reflected waves, characterized by phase and amplitude, are applied directly to the feedback path of the detector oscillator which produces the interrogating wave of radio frequency signals. Thus, according to Barkhausen's well-known criteria for oscillation, a change in phase of the reflected waves caused by an object moving within the field produces a change in the radiated signal frequency.

In the pulsed mode embodiment of my prior invention, the radio frequency oscillator amplifier is biased between conduction and nonconduction by a resistor-capacitor charging network. The oscillator inter-pulse interval is dependent upon the phase and amplitude of the reflected signal as well as the oscillator supply voltage; consequently, a change in environment which changes the phase of the reflected signal causes the oscillator quiescent repetition rate to vary.

It is desirable to maintain a constant quiescent output signal in order to reduce the complexity of equipment used to automatically monitor the system. Thus, because both the environment and moving objects reflect signals, and because in many intrusion detection applications the environment changes frequently (in warehouses the environment may change daily), it is necessary to compensate for environmental changes in order to maintain the detector output signal constant for different quiescent conditions.

The dimensions and geometry of areas in which intrusion detection systems may be employed vary greatly. A need thus exists for a detector which may be conveniently adjusted according to the area it is intended to monitor.

SUMMARY OF THE INVENTION

In an embodiment of my invention the frequency of the interrogating wave of radio frequency signals is maintained constant from one environment to another by a negative feedback voltage regulator. A detector oscillator produces a pulse of interrogating wave radio frequency signals each time a bias voltage reaches a level sufficient for the oscillator to produce sustained oscillations. The particular bias level required depends upon the phase and amplitude of the environment reflected signal and thus may be one level for a first environment and another level for a second environment. The bias voltage increases as a known mathematical function of the supply voltage during the oscillator inter-pulse interval and returns to a base level during each oscillator pulse interval. The output of the negative feedback voltage regulator is coupled to the detector as the supply voltage. The negative feedback voltage regulator output voltage is inversely proportional to the detector or oscillator repetition rate. In this way, the time required for the bias voltage to reach a level sufficient for the oscillator to produce sustained oscillations is maintained constant from one environment to another.

These and other advantages which will subsequently become apparent reside in the details of operation as more fully hereinafter described and claimed, reference being had to the accompanying drawings, wherein like numerals refer to like parts throughout, and in which:

DETAILED DESCRIPTION OF THE DRAWING

Figure 1:
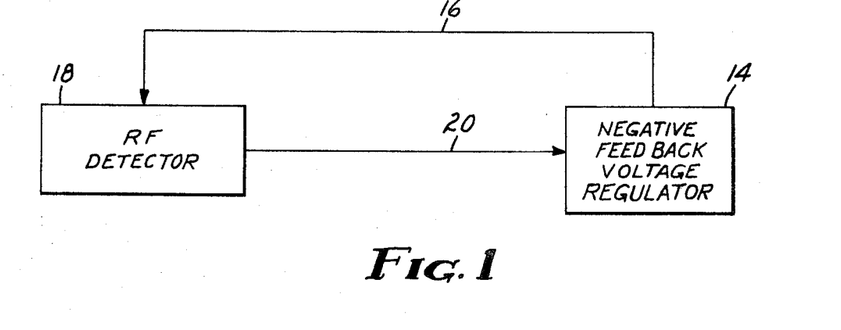
FIG. 1 is a block diagram of a radar system including a negative feedback voltage regulator for environmental compensation.
Figure 2:
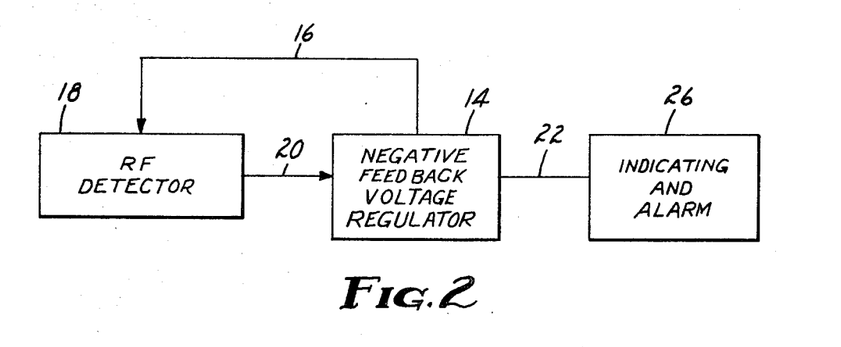
FIG. 2 is another block diagram of a radar system including a negative feedback voltage regulator and also including an alarm-and-indicator circuit.

FIG. 1 shows a block diagram of a detector system embodying my invention. With reference to FIG. 1, a negative feedback voltage regulator 14 provides a supply voltage on lead 16 to a radio frequency detector 18. The output of detector 18 is coupled by lead 20 to negative feedback circuit 14 to complete the feedback loop. FIG. 2 shows another embodiment of my invention wherein an alarm-and-indicator circuit 26 is coupled by lead 22 to the negative feedback voltage regulator.

Detector 18 includes a feedback oscillator for producing a radio frequency (rf) signal, transmitting means for propogating the rf signal through space as an interrogating wave, means for receiving reflected waves (i.e., waves which are reflections of the interrogating wave) and a bias network for operating the oscillator in a pulsed mode. The receiving means superimposes a signal representative of the phase and amplitude of the reflected wave upon the oscillator internal feedback signal to form a composite feedback signal. The phase of the composite feedback signal, according to Barkhausen's criteria for oscillation, determines the oscillator frequency. Because the phase of the composite feedback signal is related to the phase of the reflected signal, changes in the phase of the reflected signal produce a corresponding change in the oscillator frequency.

The oscillator includes an amplifier (an rf transistor) and a resonant circuit, e.g., a parallel inductive-capacitive tank circuit, the latter of which is connected in series with the transistor emitter-collector circuit. The tank circuit is coupled to the transmitting means and the transistor emitter and collector leads are coupled to the bias network. The bias network may be a restive-capacitive network charged by the supply voltage and discharged through the oscillator amplifier during the oscillator pulse interval. The oscillator provides a pulse of radio frequency energy each time the bias network forward biases the amplifier sufficient to support sustained oscillations. The bias network goes to a discharged state during each pulse interval to reverse bias the amplifier thereby terminating the pulse; during the inter-pulse interval the bias network charges, approximately exponentially, towards the supply voltage until the amplifier again produces sustained oscillations.

The emitter to base voltage required to bias the oscillator-amplifier from the nonconducting to the conducting region is independent of the received signal and supply voltage. This minimum base voltage can therefore be considered a constant and shall hereafter be denoted as $V_k$. An emitter to base bias of $V_k$ is not sufficient to produce sustained oscillation. The additional bias required to support sustained oscillation is a function of the phase and amplitude of the received signal and shall hereafter be referred to as incremental voltage $V_i$. The time required to charge the RC charging network, and hence the oscillator repetition rate, is thus proportional to $V_k + V_i$. It follows that, for a given charging voltage and for a case where the incremental voltage $V_i$ for a first environment changes to another incremental voltage $V_i'$ for another environment, then the time to charge the bias network, and hence the oscillator repetition rate, would change accordingly. Each cycle of rf oscillator operation can therefore be conveniently divided into three intervals, the first, $t_x$, commencing when the oscillator transistor amplifier base to emitter is forward biased and lasting until the oscillator achieves sustained oscillation at which time the second interval, $t_y$, begins. Interval $t_y$ corresponds to sustained oscillation of the rf oscillator, and the following interval, $t_z$, runs from the end of sustained oscillation until the amplifier base to emitter junction is again forward biased. Interval $t_y$ thus corresponds to the "pulse" portion, and intervals $t_x$ and $t_z$ to the "inter-pulse" portion of the rf oscillator cycle.

An output circuit in detector 18 passes a signal representing the pulse and inter-pulse states of the rf oscillator as the detector output signal, the repetition rate of which corresponds to the rf oscillator repetition rate.

Negative feedback voltage regulator 14 monitors the repetition rate of the detector output signal on lead 20 and provides an analog output voltage which is inversely proportional to the detector output signal repetition rate. When the repetition rate shifts from a first quiescent rate to a new rate and remains at the new rate for a given length of time, (such as when the environment changes) the incremental bias $V_i$ changes by an amount denoted herein as $\Delta V$. Negative feedback voltage regulator 14 responds to the change in detector output signal repetition rate to adjust the supply voltage provided to the oscillator on lead 16 a predetermined time after the environment change occurred. The amount of the incremental bias change is proportional to both $\Delta V$ and the bias network charging constant. Consequently, the detector repetition rate remains essentially constant from one environment to another. It was previously stated that the supply voltage adjustment was made for repetition rate changes which last a given length of time. Actually, a change affecting only a single oscillator cycle would produce a change in the supply voltage; the supply voltage change attributable to a change in a single oscillator cycle would, however, be insignificant. Further, it was stated that supply voltage changes were delayed a predetermined time. This is necessary, for if the circuit would compensate instantaneously, the system would not detect moving objects. Therefore, the delay time for any particular application can be selected according to the object to be detected; specifically, the delay time may be shorter when sensing fast moving objects than when sensing slow moving objects.

In the embodiment of FIG. 2, lead 22 provides an input to an alarm-and-indicator circuit 26 which monitors the signal on the lead 22 for prescribed deviations from the quiescent reference level. The lead 22 signal is an analog signal which, like that on lead 16, too, varies inversely as the repetition rate of the detector 18 output signal. The duration of a change in repetition rate required to produce a corresponding change in the lead 22 signal is, generally however, much less than those for changing the lead 16 voltage. The duration of a change in repetition rate is, in effect, the repetition rate of change and thus the rate of change which the objects to be detected would produce determines the minimum duration for changing the lead 22 signal. Changes in the pulse-period modulated signal repetition rate which cause the analog signal on lead 22 to deviate below or above predetermined values cause alarm-and-indicator circuit 26 to initiate an alarm and maintain such alarm for a predetermined time. After terminating the alarm, the voltage on lead 22 is again sensed and if still outside one of the predetermined levels, the alarm-and-indicator circuit reinitiates the alarm signal. This sequence of initiating and clearing the alarm according to an examination of the lead 22 waveform is continued repeatedly until the condition causing the alarm ceases to exist.

Figure 3:
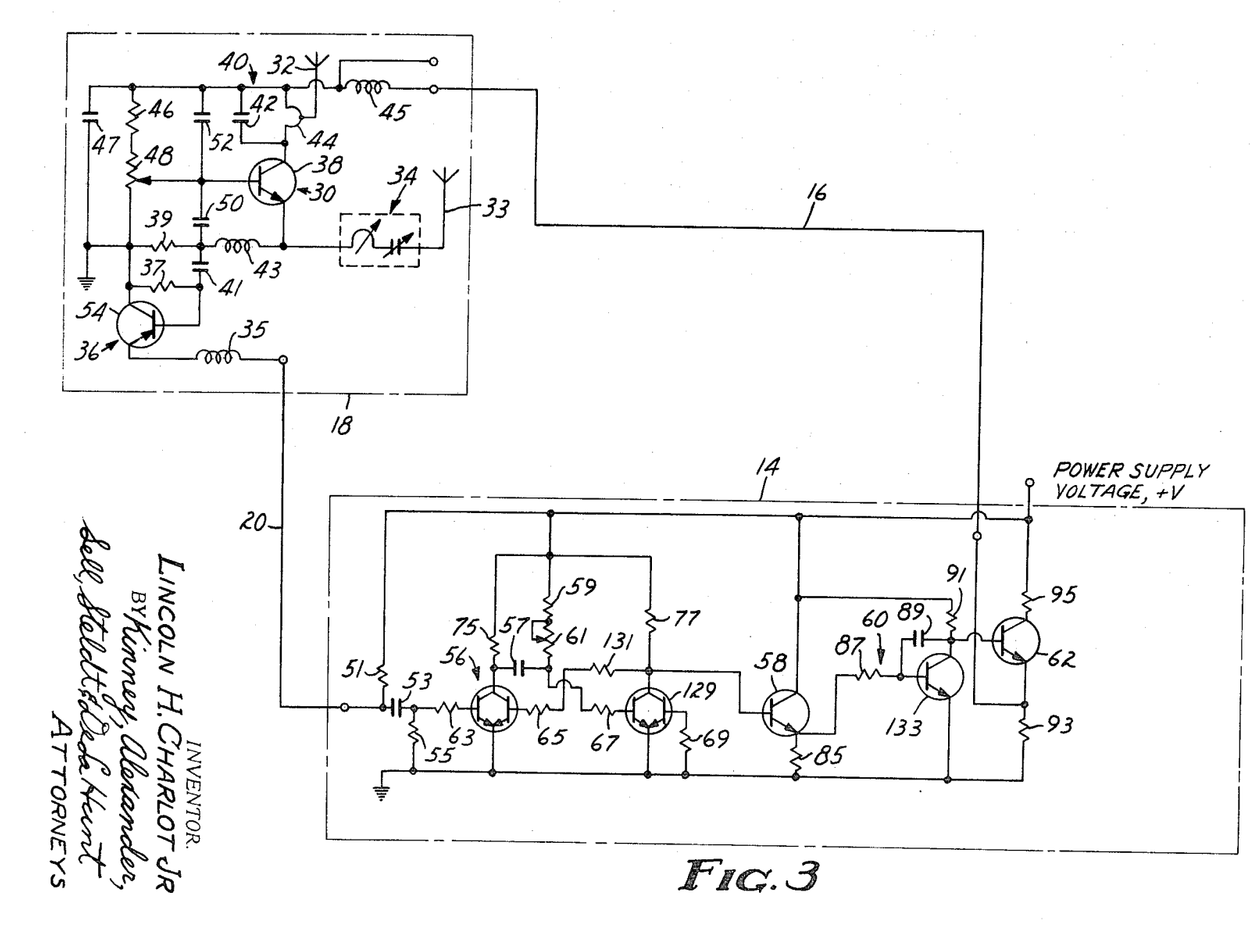
FIG. 3 is a schematic circuit diagram of a preferred embodiment of the system of FIG. 1.

FIG. 3 is a schematic diagram of the embodiment of FIG. 1. Detector 18 is shown to comprise a rf oscillator, shown generally as 30, a transmitting antenna 32, a receiving network, shown generally as 34, and an output circuit, shown generally as 36. Rf oscillator 30 consists primarily of a transistor amplifier 38 and a resonant circuit 40 consisting of a capacitor 42 connected in parallel with an inductor 44. Transmitting antenna 32 is coupled to inductor 44 to transmit radio frequency signals generated by oscillator 30. Lead 16 provides a supply of voltage for biasing amplifier 38. The amplifier 38 bias network consists primarily of resistor 46 and potentiometer 48 and shunt capacitor 50. The charging and discharging of capacitor 50, and to a lesser extent capacitor 52, operates rf oscillator 30 in a pulsed mode. Output circuit 36 consists primarily of an emitter follower 54 connected to provide a detector output signal at its emitter, the detector output signal being, therefore, a signal which substantially follows the emitter voltage of transistor amplifier 38. Accordingly, the detector output signal consists of one excursion corresponding to the oscillator pulse interval and another excursion corresponding to the oscillator inter-pulse interval.

Negative feedback voltage regulator 14 is shown to comprise a single-shot circuit 56 having its input coupled by lead 20 to output circuit 36. Single-shot 56 becomes active for each signal excursion of the detector output signal corresponding to an oscillator pulse interval and continues to be active for a time determined by capacitor 57, resistor 59 and the setting of variable resistor 61. The output of single-shot circuit 56 is coupled through an emitter follower 58 to an integrating circuit 60. The time constant of integrator 60 is selected to integrate out a change in the repetition rate of the pulse-period modulated signal appearing on lead 20 which lasts less than a predetermined time, i.e., a change which be definition corresponds to a moving object. The integrator 60 output is coupled to the base of emitter follower 62, the output of which provides the negative feedback voltage regulator output on lead 16 which is applied as the supply voltage to detector 18.

The manner in which the invention operates is as follows. Under conditions of quiescence, receiving network 34 of detector 18 is receiving a reflected signal at some phase which sets the sustained-oscillation frequency of rf oscillator 30 at a first frequency. As previously stated, a particular bias voltage amplitude is required to support sustained oscillation at the first frequency and the time required to charge capacitor 50 to that amplitude is the period of non-sustained oscillation, i.e., the inter-pulse period. If the environment is changed, changing either or both the phase and amplitude of the signal received by network 34, the incremental voltage $V_i$ on capacitor 50 required for oscillator 30 to achieve sustained oscillation changes by an amount which can be expressed as $\Delta V$. The difference in time required to add the additional voltage $\Delta V$ to capacitor 50 changes the repetition rate of the signal appearing on lead 20 which in turn changes the duty cycle of single-shot circuit 56. The change in duty cycle of single-shot 56 is reflected through emitter follower 58 to integrator 60 which changes its output voltage in inverse proportion to the change in the repetition rate. The emitter follower 62 follows the integrator 60 voltage to produce an output voltage on lead 16 which is proportional to the $\Delta V$ change in bias voltage thereby effectively making the charging time for capacitor 50 constant regardless of a change in the environment.

Figure 4:
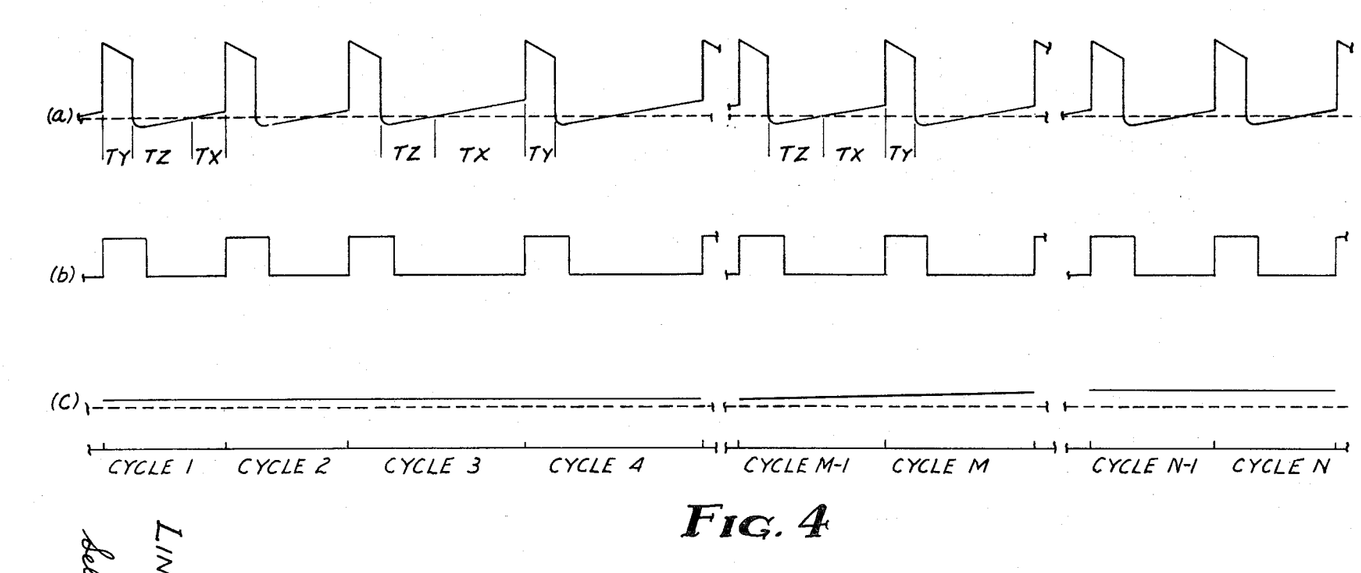
FIG. 4 shows waveforms of several of the circuits of FIG. 3 and illustrates typical changes in the circuit outputs in response to an assumed environmental change.

FIG. 4 shows output waveforms for several of the circuits illustrating how the waveforms change in reduces to hypothetical environmental change. Waveform (A) is for detector 18, (B) is for single-shot 56, and (C) is for integrator 60. Cycles 1 and 2 of the waveforms correspond to a first quiescent condition and show a duty cycle of approximately 30 percent for single-shot 56. Cycles 3 and 4 represent a change in environment which changed the single-shot duty cycle to approximately 25 percent. (The particular change in duty cycle was selected for illustration purposes only; in actual practice, the duty cycle will on occasion increase and on others decrease.) Because of the large time constant of integrator 60, no change is seen in the output voltage of emitter follower 62 until cycles M-1 and M at which time the voltage is shown to begin increasing. As the supply voltage on lead 16 increases, the time required to charge capacitor 50 of detector 18 decreases, thereby increasing the repetition rate of the detector output signal which in turn reduces the duty cycle of the single-shot circuit 56, until at cycles N-1 and N the duty cycle of single-shot 56 is once again approximately 30 percent and the output voltage is constant at some greater amplitude.

Figure 5:
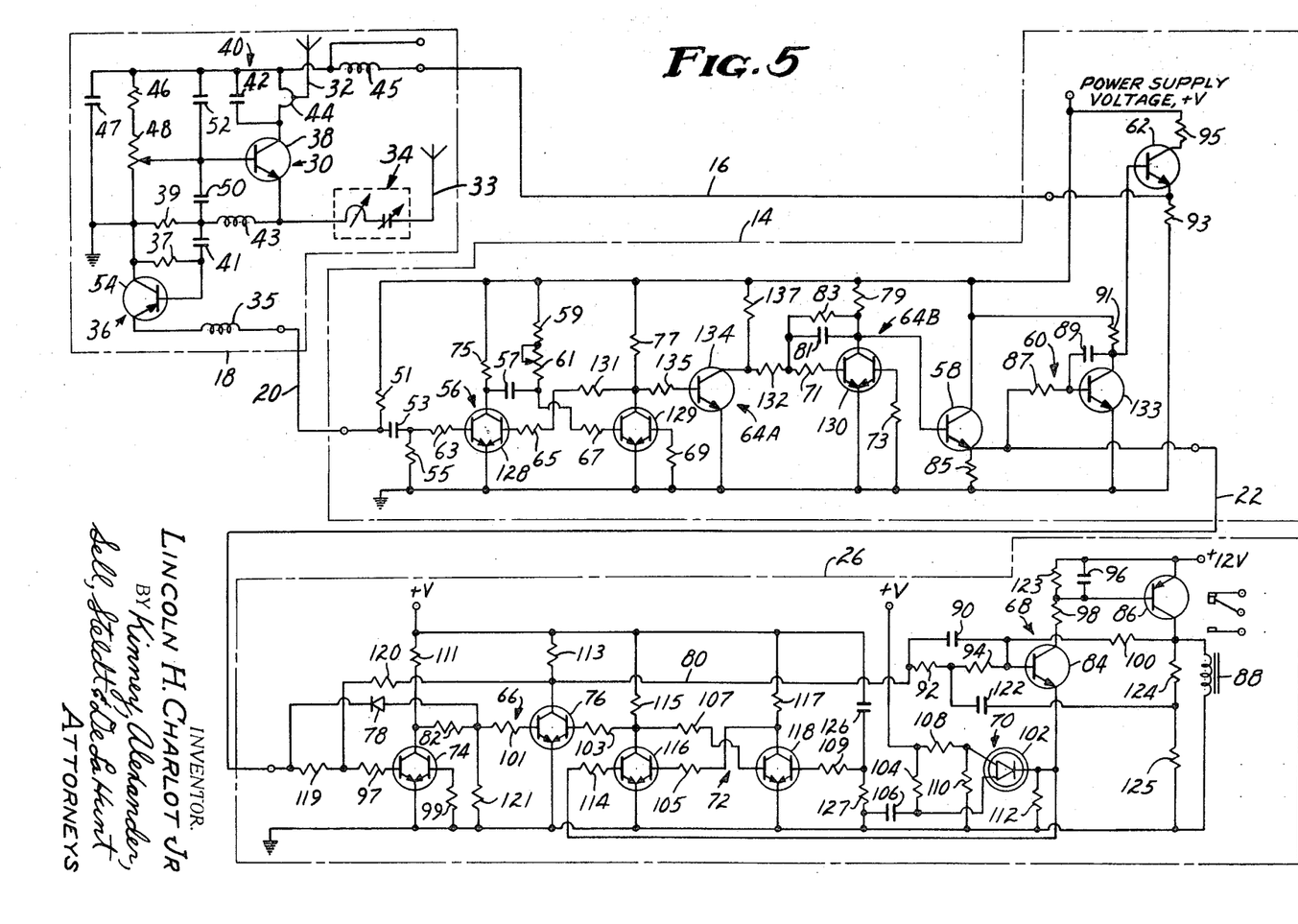
FIG. 5 is a schematic circuit diagram of a preferred embodiment of the system of FIG. 2.

FIG. 5 shows another embodiment of the invention and corresponds to the block diagram of FIG. 2. This embodiment differs from that just described in that additional integrators 64A and 64B are coupled between emitter follower 58 and single-shot 56. The integration constant of integrator 64B is much much less than that of integrator 60 and the integration constant of integrator 64A is insignificant. The exact value of the integration constant of integrator 64B is chosen to prevent very rapid rates of change, such as those caused by birds flying through the monitored area, from generating an alarm signal. It should be noted that the purpose of the two integrators, 64A and 64B, is simply to provide an increased integration constant and an output signal that is non-inverting with respect to the input. Therefore the integrators 64A and 64B could be replaced with one non-inverting integrator with the proper integration constant. The output of emitter follower 58, in addition to being coupled to integrator 60, is coupled by lead 22 to alarm-and-indicator circuit 26.

Alarm-and-indicator circuit 26 is shown to comprise a trigger circuit, shown generally as 66, a decaying memory circuit, shown generally as 68, a programmable unijunction transistor (PUT) circuit, shown generally as 70, and a reset flip-flop circuit, shown generally as 72. Alarm-and-indicator circuit 26 monitors the D.C. voltage level of the voltage on lead 22 and responds to deviations of said voltage of predetermined amplitude from a predetermined quiescent amplitude to produce an output signal for signifying the presence of a moving object within the monitored area. Because some deviations of the voltage on lead 22 represent events for which an alarm should not be indicated, alarm-and-indicator circuit 26 includes means for discriminating between such spurious signals and signals representative of a true alarm condition.

Under conditions of quiescence, transistor pair 74 of trigger circuit 66 is normally nonconducting and transistor pair 76 is conducting. Diode 78 is only slightly forward biased and thus draws only a small amount of current. The output from trigger 66 is taken from the collector of transistor pair 76 via lead 80 and applied to decaying memory circuit 68. Accordingly, under conditions of quiescence, the input to decaying memory circuit 68 is the collector voltage of matched transistor pair 76, or approximately ground voltage since that transistor pair is conducting. The voltage on lead 80 will switch to approximately the power supply voltage, shown in FIG. 5 as +V if transistor pair 76 is switched off, which occurs whenever the voltage on lead 22 varies approximately 0.2 volt from its nominal quiescent level. Should the voltage on lead 22 increase by approximately 0.2 volt, the left hand base of transistor pair 74 becomes sufficiently positive to forward bias transistor pair 74 into conduction whereupon the left hand base of transistor pair 76 is pulled toward ground through resistor 82 thereby reverse biasing transistor pair 76. On the other hand, should the voltage on lead 22 drop approximately 0.2 volt from its quiescent level, diode 78 is forward biased into heavy conduction, which increases the voltage appearing at the left hand base of transistor pair 74 and decreases the voltage appearing at the left hand base of transistor pair 76. As transistor pair 74 begins to conduct, the left hand base of transistor pair 76 is further reverse biased thereby shutting off transistor 76 and again providing an output on lead 80 of approximately $+V$.

The manner in which the decaying memory circuit 68 responds to voltage variations on lead 80 will now be described. Decaying memory circuit 68 will provide an alarm indication whenever rapidly occurring, short duration, positive going pulses appear on lead 80 or whenever the voltage on lead 80 rises to its positive level and remains there for a prescribed period of time. The rapidly occurring pulses correspond to the effect produced by a man running through the monitored area and the condition of a single, long duration, positive pulse corresponds to a man moving through the monitored area very slowly. Spurious pulses occurring for relatively short periods of time, and not recurring, are screened by the decaying memory circuit.

Decaying memory circuit 68 is shown to comprise a pair of transistor switches 84 and 86 which are normally in a nonconducting state. The collector of transistor 86 is connected to the pull-in coil of a relay 88 so as to pull in the relay whenever switch 86 is driven into conduction. Relay 88 provides an output signal indicative of an alarm condition and may be used to sound an audible alarm, to turn on a light, to initiate a telephone dialing sequence, or any of a variety of alarm indications, the exact form of which is incidental to this disclosure and will not be discussed further. The base of switch 84 is coupled by the parallel combination of a capacitor 90 and resistors 92 and 94 to lead 80. When a short duration pulse appears on lead 80, it is coupled by capacitor 90 to the base of 84 thereby momentarily switching transistor 84 into a conducting state which in turn produces an incremental charge in a capacitor 96 which is coupled between the base and emitter of switch 86. Transistor 84, collector resistor 98 and capacitor 96 are selected such that the charge stored in capacitor 96 for a single pulse is not sufficient to forward bias transistor 86. Discharge resistor 100 is selected so that the charge stored in capacitor 96 will decay very slowly. Accordingly, if short duration pulses on lead 80 occur rapidly, each successive pulse increases the charge on capacitor 96 until transistor 86 is forward biased. Decaying memory circuit 68 thus provides an integration of the trigger circuit 66 output and provides an alarm indication by pulling in relay 88 when the trigger circuit output integral exceeds a calculated limit.

With transistor 86 conducting, the base of transistor 84 is forward biased through resistor 100 which is coupled to the collector of transistor 86. Transistors 84 and 86 remain in the conducting state until a positive going pulse at the emitter of transistor 84 momentarily reverse biases the transistor whereupon the base bias of transistor 86 is removed, causing it to stop conducting and in turn removing the forward bias supplied through resistor 100 to transistor 84.

The pulse for reverse biasing transistor 84 is provided by the programmable unijunction transistor circuit 70 which also serves as means for preventing generation of alarm signals when the system is initially turned on. Circuit 70 consists of a programmable unijunction transistor 102 which has its anode connected to resistor 104 and capacitor 106. Resistor 104 and capacitor 106 are connected in series with some positive voltage source, for the present example, +9.1 volts. The gate of unijunction transistor 102 is connected to voltage divider resistors 108 and 110. Initially, capacitor 106 is discharged. Thus, transistor 102 is reverse biased and its cathode, which is coupled to ground through resistor 112, is at approximately ground potential. When the system is initially switched on, capacitor 106 begins charging toward +9.1 volts and when it reaches a voltage greater than the gate voltage, unijunction transistor 102 is biased into conduction thereby raising the voltage appearing at its cathode to approximately +3 volts. Capacitor 106 then rapidly discharges thereby reverse biasing unijunction transistor 102 and the cycle starts over. The RC time constant of resistor 104 and capacitor 106 is very large, and for the particular system illustrated, the interval between pulses of positive going excursions appearing at the cathode of 102, the maximum on-time for transistors 84 and 86, is approximately 1 minute and 15 seconds.

It was previously stated that PUT circuit 70 also served to prevent generation of false alarms when the system is first initiated. This is accomplished by coupling the programmable unijunction transistor cathode voltage through resistor 114 to the left hand base of transistor pair 116. Transistor pair 116 is cross-coupled in a conventional manner with transistor pair 118 to form reset flip-flop 72. The collector of transistor pair 116 is coupled to the right hand base of transistor pair 76 in the trigger circuit. When transistor pair 118 is conducting, transistor pair 116 is nonconducting and its collector voltage is approximately $+V$. The voltage at the right hand base of transistor pair 76 is thus also approximately $+V$ and the transistor therefore conducts. Transistor 76 will remain forward biased until the state of flip-flop 72 is changed and thus the voltage on lead 80 will be at approximately ground level until such change of state occurs. This occurs when the left hand base of transistor pair 116 is forward biased which happens for each positive excursion of the unijunction transistor 84 emitter voltage. When the system is first turned on, transistor pair 118 is conducting and capacitor 106 is discharged. Transistor pair 76 therefore conducts and holds the lead 80 voltage at approximately ground until the charge on capacitor 106 forward biases programmable unijunction transistor 102 which in turn forward biases transistor pair 116.

In one embodiment of FIG. 5 the following components were utilized:

| | |
|---|---|
| Transmitting antenna 32 | a conductor strip approximately 5 centimeter long, tapering uniformly along its length from a width of 1 centimeter at one end to 0.2 centimeter at the other end; the smaller end is connected to inductor 44 at a point, measured from the grounded end, approximately 1/3 the length of inductor 44. |
| Receiving antenna 33 | illustrated symbolically as a separate component in actual embodiment, piston trimmer capacitor 34 served as the receiving antenna. |
| Piston Trimmer Capacitor 34 | J F D Co.   VC 58 G |
| Radio Frequency Choke 35 | 1.20 $\mu$ Hy |
| Transistor 54 | 2 N 3702 |

| | |
|---|---|
| Resistor 37 | 2.7K ohms |
| Transistor 38 | 2 N 5179 |
| Resistor 39 | 2.2K ohms |
| Capacitor 41 | 0.01 μfd. |
| Capacitor 42 | 0.68 μμ fd. |
| Radio Frequency Choke 43 | 0.47 μHy |
| Inductor 44 | formed with printed conductor, approximately 0.07 μ h |
| Radio Frequency Choke 45 | 1.20 μ Hy |
| Resistor 46 | 1K ohms |
| Capacitor 47 | 25 μ fd. |
| Resistor 48 | 5K ohms Potentiometer |
| Capacitor 50 | 0.47 μ fd. |
| Resistor 51 | 680 ohms |
| Capacitor 52 | 0.05 μ fd. |
| Capacitor 53 | 0.1 μ fd. |
| Resistor 55 | 2.2K ohms |
| Capacitor 57 | 0.022 μ fd. |
| Transistor 58 | 2 N 5172 |
| Resistor 59 | 1K ohm |
| Resistor 61 | 2.0 K ohms |
| Resistors 63, 65, 67, 69, 71, 73, 75, 77, 79, Transistors 128, 129, 130 | Motorola I.C. (MC – 817 P) |
| Transistor 62 | 2 N 5172 |
| Transistors 74, 76, 116, 118 Resistors 97, 99, 101, 103, 105, 107, 109, 111, 113, 114, 115, 117 | Motorola I.C. (MC-817 P) |
| Diode 78 | IN 4154 |
| Capacitor 81 | 0.1 μ fd. |
| Resistor 82 | 10K ohms |
| Resistor 83 | 27K ohms |
| Transistor 84 | 2 N 3392 |
| Resistor 85 | 220 ohms |
| Transistor 86 | 2 N 3702 |
| Resistor 87 | 27K ohms |
| Relay 88 | Computer Components Inc. OPC-1C-12 |
| Capacitor 89 | 300 μ fd. |
| Capacitor 90 | 0.05 μ fd. |
| Resistor 91 | 10K ohms |
| Resistor 92 | 56K ohms |
| Resistor 93 | 10K ohms |
| Resistor 94 | 10K ohms |
| Resistor 95 | 270 ohms |
| Capacitor 96 | 4.7 μ fd. |
| Resistor 98 | 2.9K ohms |
| Resistor 100 | 27K ohms |
| Unijunction Transistor 102 | General Electric PN D 13-TI |
| Resistor 104 | 680K ohms |
| Capacitor 106 | 100 μ fd. |
| Resistor 108 | 22K ohms |
| Resistor 110 | 22K ohms |
| Resistor 112 | 180 ohms |
| Resistor 119 | 1K ohms |
| Resistor 120 | 22K ohms |
| Resistor 121 | 10K ohms |
| Capacitor 122 | 30 μ fd. |
| Resistor 123 | 470K ohms |
| Resistor 124 | 4.7K ohms |
| Resistor 125 | 390 ohms |
| Capacitor 126 | 0.1 μ fd. |
| Resistor 127 | 100K ohms |
| Resistor 131 | 22K ohms |
| Resistor 132 | 8.2K ohms |
| Transistor 133 | 2 N 3392 |
| Transistor 134 | 2 N 3392 General Electric |
| Resistor 137 | 680 ohms |
| Resistor 135 | 1.5K ohms |

Resistors 48 is initially adjusted to set the voltage on lead 16 to approximately 7.0 volts, and piston trimmer capacitor 34 is set for optimum radar range. The detector has a radiated power of from 50 to 100 micro watts, a frequency of 910 megahertz, plus of minus 5 percent.

One application of a detector made with the foregoing components and according to FIG. 5 is for protection of a residence. In such an application, at least one detector is positioned such that the field of rf signals from transmitting antenna 32 occupy the area through which an intruder would have to pass in order to gain access to the home. The response to a given class of objects, and hence the detector range may be selected by adjustment of variable resistor 61 in single-shot circuit 56.

Variable resistor 61 may be set to provide a resistance of from zero to 5,000 ohms to vary, interdependently, the duration of the single-shot pulse interval, the supply voltage, and the rf oscillator pulse repetition rate. Under quiescent conditions single-shot 56 has a duty cycle of approximately 30 percent and thus for a setting of resistor 61 of 5,000 ohms the single-shot inter-pulse period, and the interrelated oscillator period of non-sustained oscillation, is many times greater than for a setting of resistor 61 of zero ohms. Accordingly, since the net change in the non-sustained oscillation period for a given movement and environment is always substantially the same, the percentage change in the non-sustained oscillation period is small for a resistor 61 setting of 5,000 ohms as compared to the percentage change for a resistor 61 setting of zero ohms. And, resistor 61 thus permits selective adjustment of the detector range. In a residence protection application, the particular setting of resistor 61 might, for example, depend upon the surrounding of the home to be protected, i.e., the range would generally be selected so that vehicles in the street or in a neighbors driveway would not trigger an alarm.

The invention as described in the illustrative embodiment of FIG. 5 is intended primarily for detection of human beings and objects of like cross-sectional area, like reflectivity, and which move at approximately the same speed as a human being. One skilled in the art will readily appreciate that the invention is not so limited but may be easily adapted to sense other objects. For example, to sense objects moving at speeds other than that assumed for humans, the integration constant of integrator 64 would be changed. By making the integration constant smaller, the detector would be more sensitive to objects smaller than a human and, conversely, a larger integration constant would be suitable for sensing slower moving objects. To sense objects differing from a human in cross-sectional area, the detector frequency would be changed to provide a half-wave length which was a significant percentage, at least one-half, of the object cross-sectional area, which change would primarily involve capacitor 42 and inductor 44 of the resonant circuit. A method of tuning the detector to sense objects of different reflectivity would be to adjust the voltage differential for triggering alarm-and-indicator circuit 26.

From the foregoing description, the construction, operation and utility of the radar detector of the present invention will be apparent. The foregoing is considered as illustrative only of the principles of the invention. Further, since numerous modifications and changes will readily occur to those skilled in the art, it is not desired to limit the invention to the exact construction and operation shown and described. In particular, the oscillator amplifier, instead of being operated between conduction and nonconduction, may be operated between nonsaturated conduction and saturation. Accordingly, this particular modification and all other suitable modifications and equivalents may be resorted to which fall within the scope of the invention as claimed.

I claim:

1. In a radar detector having
    a radio frequency feedback oscillator for producing an interrogating wave of radio frequency signals, the radio frequency oscillator being responsive to a composite feedback signal to set the interrogating wave frequency to correspond to the phase of the composite feedback signal, the oscillator being responsive to the amplitude of a bias voltage to produce pulses of radio frequency signals, the pulse interval corresponding to the oscillator state of sustained oscillation and the inter-pulse interval corresponding to the oscillator state of non-sustained oscillation, the oscillator being responsive to a bias voltage of a first amplitude to produce sustained oscillations at a first frequency when the composite feedback signal has a first phase and amplitude and the oscillator being responsive to a bias voltage of another amplitude to produce sustained oscillations at another frequency when the composite feedback signal has another phase and amplitude;

an external feedback loop which receives reflections of the interrogating wave and superimposes the reflections upon the oscillator internal feedback signal to form the composite feedback signal;

means for producing the bias voltage, the amplitude of the bias voltage increasing according to a mathematical function of a supply voltage during each oscillator inter-pulse interval and decreasing to a base level during each oscillator pulse interval; and an output circuit for providing a detector output signal having a repetition rate which corresponds to the radio frequency oscillator repetition rate;

the improvement comprising:

a negative feedback voltage regulator for providing an output voltage as the supply voltage, which supply voltage is inversely proportional to the repetition rate of the detector output signal, the regulator being responsive to a change in the detector output repetition rate that lasts a given length of time to adjust the supply voltage a predetermined time after the change in detector output repetition rate, the amount of the voltage adjustment being directly proportional to the difference between the first bias voltage amplitude and second bias voltage amplitude in magnitude and of the same sign.

2. The detector of claim 1 wherein the negative feedback voltage regulator further comprises a single-shot circuit for producing an output signal the duty cycle of which is directly proportional to the repetition rate of the detector output signal, the active interval of the single-shot circuit output signal being initiated by the detector output signal portion corresponding to the oscillator state of sustained oscillation; and an integrating circuit for producing the regulator output as an analog output voltage, the amplitude of which is inversely proportional to the duty cycle of the single-shot output signal.

3. The detector of claim 2 wherein the integrating circuit comprises a first emitter follower coupled to receive the single-shot output signal as an input signal;

a Miller integrator coupled to receive the first emitter follower output as its input; and a second emitter follower responsive to the Miller integrator output to produce the regulator output voltage.

4. The detector of claim 3 wherein the Miller integrator has an integrating constant of approximately 600 seconds.

5. The radar detector of claim 4 wherein the single-shot circuit includes means for adjusting the width of the active interval.

6. The radar detector of claim 5 wherein the active interval adjustment means is a variable resistance potentiometer.

7. The radar detector of claim 1 wherein the negative feedback voltage regulator comprises a single-shot circuit;

a multistage integrator having a first integrator coupled to receive the single-shot circuit output signal for producing an output signal; and a second integrating stage coupled to the output of the first integrating stage for producing an analog output voltage as the regulator output voltage.

8. The radar detector of claim 7 wherein the first integrator has an integration constant of approximately 0.02 seconds and wherein the second integrator has an integration constant of approximately 600.0 seconds.

9. The radar detector of claim 7 further including an alarm-and-indicator circuit for producing an electrical output signal in response to prescribed deviations of the first integrator output signal from a predetermined reference level.

10. The radar detector of claim 9 wherein the alarm-and-indicator circuit includes a trigger circuit for producing a bistable output signal, one state of the trigger circuit producing a first output signal when the first integrator output signal is less than the prescribed deviation from the predetermined reference level, the other state of the trigger circuit producing a second output signal when the first integrator output signal is greater than the prescribed deviation from the predetermined reference level; and means for integrating the trigger circuit output and for producing the electrical output signal when the integration exceeds a specified limit.

11. The radar detector of claim 10 wherein the alarm-and-indicator circuit further includes means for momentarily and periodically disabling the means for producing the electrical output signal.

12. The radar detector of claim 10 wherein the alarm-and-indicator circuit further includes means for temporarily holding the trigger circuit in the state corresponding to the first integrator output signal being less than the prescribed deviation from the predetermined reference level for a fixed time after the supply voltage is turned on.

13. In a pulsed mode radar detector including a radio frequency oscillator which produces a pulse of radio frequency energy each time a bias voltage of a bias voltage producing means reaches a level sufficient to support sustained oscillation of the oscillator, the oscillator producing sustained oscillations at a first bias voltage level for a first environment and producing oscillations at a second bias voltage level for another environment, the bias voltage increasing as a known mathematical function of a supply voltage during each oscillator inter-pulse interval and returning to base level during each oscillator pulse interval, the improvement comprising:

a negative feedback voltage regulator for providing an output voltage which is inversely proportional to the repetition rate of the detector output signal, the regulator being responsive to a change in the detector output repetition rate that lasts a given length of time to adjust the supply voltage a predetermined time after the change in detector output repetition rate, the amount of the voltage adjustment being directly proportional to the difference between the first bias voltage amplitude and second bias voltage amplitude in magnitude and of the same sign; and means for coupling the regulator output voltage to the bias voltage producing means as the supply voltage.

14. A radar type detecting apparatus wherein an interrogating wave of radio frequency signals is produced from an oscillator during pulse intervals controlled by a supply voltage charged bias network, is propagated into an environment, and is reflected therefrom to produce a reflected signal and wherein the quiescent frequency of the interrogating wave and the repetition rate of the pulse intervals are dependent upon a combination of the supply voltage amplitude and the reflected signal amplitude and phase; whereby a change in the environment changes the amplitude and phase of the reflected signal and thereby causes said quiescent frequency and repetition rate to vary;

wherein the improvement comprises regulating means for maintaining said quiescent frequency and repetition rate constant from one environment to another, by regulating the supply voltage in response to changes in the repetition rate which result from changes in the environment, as opposed to movement within the environment.

15. A radar type detecting apparatus according to claim 14, characterized by the feature that the regulating means comprise integrating means for providing to said bias network as said supply voltage, a signal obtained by integrating a signal representative of said repetition rate, wherein the integrating means has a time constant representative of a period of time characteristic of a change in the environment, as opposed to a period of time characteristic of movement within the environment.

16. A radar type detecting apparatus according to claim 14, wherein said apparatus further comprises means for sensing for changes in the repetition rate which result from movement within the environment as opposed to changes in the environment and for producing an alarm signal in response thereto.

* * * * *